United States Patent
Bush et al.

(10) Patent No.: US 7,255,498 B2
(45) Date of Patent: Aug. 14, 2007

(54) LOW PROFILE SYSTEM FOR JOINING OPTICAL FIBER WAVEGUIDES

(76) Inventors: Simon P. Bush, 404 Greystone La., Ambler, PA (US) 19002; Nellie L. Cabato, 2 Hazelwood Cir., Plymouth Meeting, PA (US) 19462; John A. Crowell, 3319 Breidarlik Dr., Wilmington, DE (US) 19807; Cheng P. Ma, 700 Evergreen Ct., North Wales, PA (US) 19454; Andrew Vellrath, 34 E. Third St., New Castle, DE (US) 19720; Laurence N. Wesson, 625 Cranstone La., Blue Bell, PA (US) 19422

( * ) Notice: Subject to any disclaimer, the term of this patent is extended or adjusted under 35 U.S.C. 154(b) by 0 days.

(21) Appl. No.: 11/477,318

(22) Filed: Jun. 29, 2006

(65) Prior Publication Data

US 2006/0266082 A1    Nov. 30, 2006

Related U.S. Application Data

(62) Division of application No. 10/806,533, filed on Mar. 23, 2004, now Pat. No. 7,070,342.

(60) Provisional application No. 60/456,915, filed on Mar. 24, 2003.

(51) Int. Cl.
*G02B 6/255* (2006.01)

(52) U.S. Cl. .............................. 385/96; 385/95; 385/97

(58) Field of Classification Search .................. 385/96, 385/95, 97
See application file for complete search history.

(56) References Cited

U.S. PATENT DOCUMENTS 4,274,707 A    6/1981    Pacey et al. ............... 350/96.2

(Continued)

OTHER PUBLICATIONS

Ericsson, "PM Splicing with Ericsson—Fusion Splicer FSU 995 for Industrial Splicing", http://www.ericsson.com/networktechnologies/printed/broshyr/1061_pm_revc.pdf, no date.

(Continued)

*Primary Examiner*—K. Cyrus Kianni
(74) *Attorney, Agent, or Firm*—Ernest D. Buff & Associates, LLC.; Ernest D. Buff; Gordon E. Fish

(57) ABSTRACT

A compact, low profile splicing system for joining optical fibers produces durable, low transmission loss fusion splices. The system employs active optical techniques such as profile alignment or local injection and detection to achieve optimized alignment of the fibers prior to fusion. Light injected into one fiber is propagated across the interface to a second fiber. A detector senses the intensity of the injected light in the second fiber. After the relative position of the fibers is manipulated to maximize the transmitted intensity, the fibers are fusion spliced using an electric arc discharge. The accurate alignment achievable using the local injection and detection system to drive adaptive fiber positioning affords a method for reliably producing low loss splices. The present system is compact and low in profile, making it operable in cramped quarters with limited clearance to adjacent equipment and structures and with only a minimal amount of free fiber slack available. Simplicity of design and operation make the system rugged and enable accurate alignment and low loss fusion of fibers under adverse working conditions.

13 Claims, 10 Drawing Sheets

U.S. PATENT DOCUMENTS

| | | | | |
|---|---|---|---|---|
| 4,548,630 A | 10/1985 | Biedka | ............................ | 65/2 |
| 4,696,535 A | 9/1987 | Saha | ........................ | 350/96.15 |
| 4,735,481 A | 4/1988 | Lukas et al. | ................ | 350/96.2 |
| 4,765,704 A | 8/1988 | Pers | ......................... | 350/96.15 |
| 4,790,617 A | 12/1988 | Campbell et al. | ......... | 350/96.15 |
| 4,824,199 A | 4/1989 | Uken | ........................ | 350/96.15 |
| 4,832,438 A | 5/1989 | Engel et al. | ................. | 350/96.2 |
| 4,911,524 A | 3/1990 | Itoh et al. | ................. | 350/96.21 |
| 4,950,046 A | 8/1990 | Hughes et al. | ............ | 350/96.18 |
| 4,978,201 A | 12/1990 | Yamada et al. | .............. | 350/320 |
| 5,002,357 A | 3/1991 | Newell | ....................... | 350/96.2 |
| 5,011,259 A | 4/1991 | Lieber et al. | ............. | 350/96.21 |
| 5,013,345 A * | 5/1991 | Itoh et al. | ....................... | 65/407 |
| 5,195,157 A | 3/1993 | Penfold | ......................... | 385/96 |
| 5,249,246 A | 9/1993 | Szanto | ........................ | 385/96 |
| 5,249,247 A | 9/1993 | Whitesmith | .................. | 385/96 |
| 5,257,337 A | 10/1993 | Grigsby et al. | ................ | 385/99 |
| 5,340,371 A | 8/1994 | Dyott | ........................... | 65/501 |
| 5,417,733 A | 5/1995 | Wesson | ........................ | 65/378 |
| 5,481,640 A | 1/1996 | Harman et al. | .............. | 385/147 |
| 5,533,160 A | 7/1996 | Watanabe et al. | ............. | 385/96 |
| 5,561,728 A * | 10/1996 | Kobayashi et al. | ............ | 385/97 |
| 5,570,446 A | 10/1996 | Zheng et al. | ................. | 385/98 |
| 5,611,015 A * | 3/1997 | Tokumaru et al. | ............ | 385/98 |
| 5,677,973 A | 10/1997 | Yuhara et al. | ................. | 385/90 |
| 5,758,000 A | 5/1998 | Zheng | .......................... | 385/97 |
| 5,815,611 A | 9/1998 | Dhadwal | ..................... | 385/12 |
| 5,904,413 A * | 5/1999 | Ruegenberg et al. | ....... | 356/73.1 |
| 6,034,718 A | 3/2000 | Hattori | ......................... | 348/61 |
| 6,046,798 A * | 4/2000 | Zamzow | ..................... | 356/73.1 |
| 6,088,503 A | 7/2000 | Chandler et al. | ............ | 385/135 |
| 6,190,057 B1 | 2/2001 | Osaka et al. | ................... | 385/96 |
| 6,203,214 B1 | 3/2001 | Wesson | ........................ | 385/97 |
| 6,206,583 B1 * | 3/2001 | Hishikawa et al. | ............ | 385/96 |
| 6,246,819 B1 | 6/2001 | Windebank | ................... | 385/48 |
| 6,287,020 B1 | 9/2001 | Osaka et al. | .................... | 385/96 |
| 6,294,760 B1 | 9/2001 | Inoue et al. | .................. | 219/383 |
| 6,324,319 B1 | 11/2001 | Tselikov et al. | ................ | 385/28 |
| 6,341,242 B1 | 1/2002 | Mahmood et al. | ........... | 700/117 |
| 2002/0131729 A1 * | 9/2002 | Higgins, III | .................. | 385/91 |
| 2002/0159724 A1 * | 10/2002 | Oki et al. | ....................... | 385/97 |

OTHER PUBLICATIONS

Ericsson, "Three Splicers—Each With Its Own Unique Features", En/LZT 108 1069, http://www.ericsson.com/networktechnologies/printed/broshyr/1069_fsu995_revb.pdf, no date.

FITEL Technologies, Inc., "Polarization Maintaining Fiber Fusion Splicer", models S182 PM & S182 PM-H, http://www.fitelconn.com/pdf/s182pm.pdf, and http://www.fitelconn.com/pdf/s182pmh.pdf, no date.

Fujikura, "Products FSM-40PM Factory Splicer for Polarization Maintining Fiber Splicing", http://www.fujikura.co.jp/splicer/fsm-40pm/fsm-40pm.html, no date.

Fujikura, "Products FSM-40PM Factory Splicer for Polarization Maintining Fiber Splicing", http://www.fujikura.co.jp/splicer/fsm-40f/fiber-holder-system/fiber-holder-system.html, no date.

Fujikura, "Products FSM-40PM Splice Data For PANDA & Tiger™ Fibers", http://www.fujikura.co.jp/splicer/fsm-40pm/splice-data/splice-data.html, no date.

Fujikura, "Products FSM-40PM Typical Tensile Strength Data", http://www.fujikura.co.jp/splicer/fsm-40f/tensile-strength-data/high-tensile-strength.html, no date.

"The Significance of Polarization Cross-Talk vs. Extinction Ratio In The Analysis and Measurement of PM Fiber Splicing Performance", *AFL—Fujikura Proprietary*, no date.

* cited by examiner

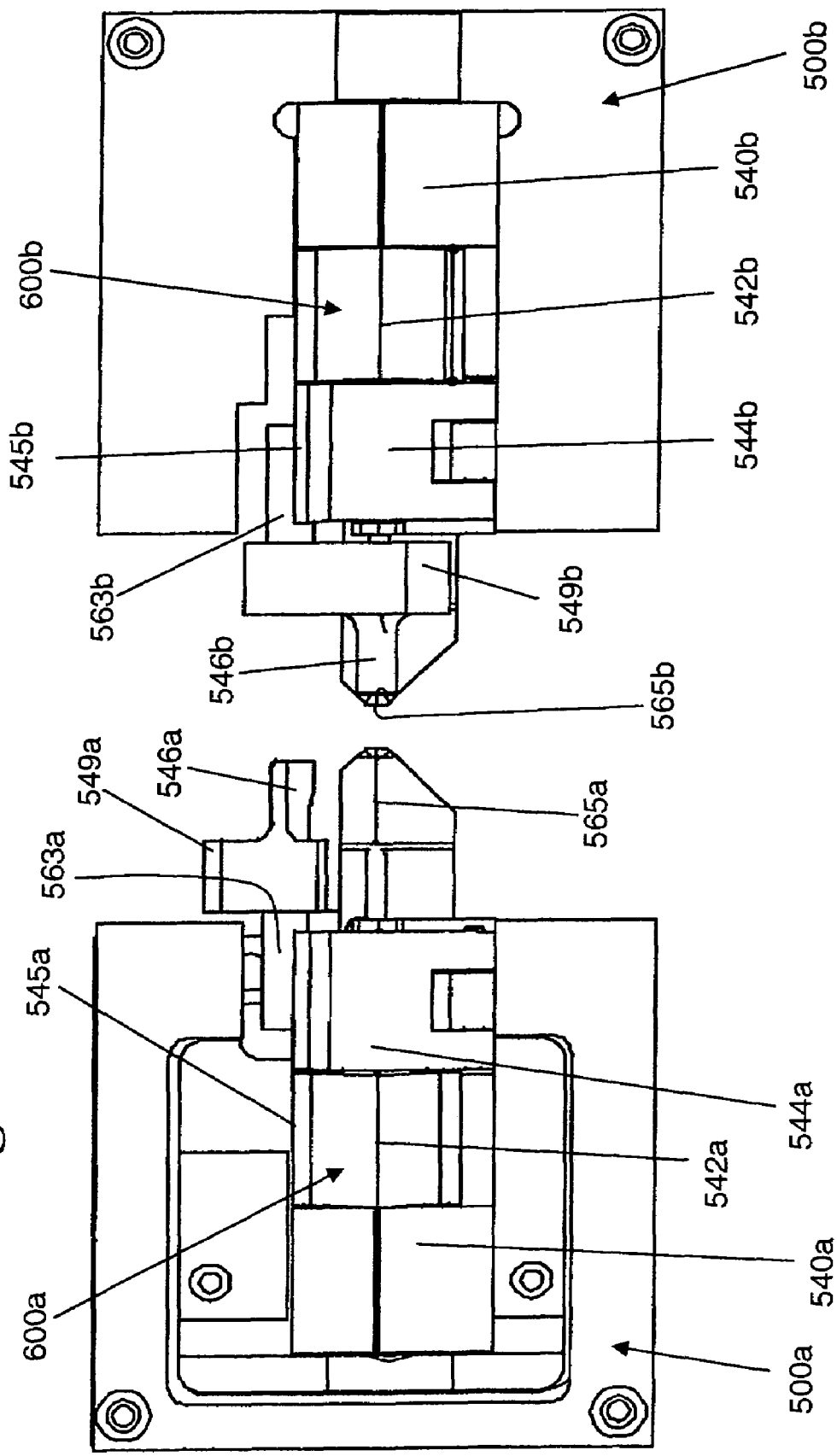

LOW PROFILE SYSTEM FOR JOINING OPTICAL FIBER WAVEGUIDES

This application is a divisional of application Ser. No. 10/806,533 Filed Mar. 23, 2004, now U.S. Pat. No. 7,070,342. This application claims the benefit of application no. 60/456915, filed Mar. 24, 2003.

BACKGROUND OF THE INVENTION

1. Field of the Invention

This invention relates to an apparatus for joining optical fiber waveguides; and more particularly, to a low profile system that adaptively positions the fibers being joined prior to fusion splicing, so that the transmission loss of the joined fiber is minimized.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by lasers or light emitting diodes (LED's), which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cable and lower frequency electromagnetic broadcasting such as radio and microwave. Foremost is the much larger bandwidth available. In addition, existing infrastructure such as cable ducts, utility poles, and the like presently used by telecommunications companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

Fiber optic communications have additional advantages for certain specialized requirements. Fiber optic connections are far less vulnerable to electromagnetic disruptions and nuclear radiation, whether of natural origin or the result of the use of certain military weapons. Fiber optics are now widely used in aerospace and shipboard applications for many of these reasons.

Implementation of fiber optic systems requires both the equipment for actual transmission and processing of the data, and the equipment needed to install and maintain the fiber optic system and its infrastructure. The transmission and processing equipment, such as the fiber itself and the corresponding components needed to generate, detect, and process optically-borne information, have been developed to an ever increasing level of sophistication. While certain systems for joining and splicing fiber optic cables have been developed, there remains a need in the art for improved equipment and methods for splicing that are reliable, economical, and which result in minimal loss of signal integrity and strength. Such systems, equipment, and methods are essential if the full inherent advantages of optical transmission are to be more widely implemented.

The need for improved methods is especially acute for field installation and repair, which are frequently carried out under adverse conditions. Among the most significant needs is for effective means of splicing fiber optic cables both during initial installation and when repairs or modifications are needed. In the telecommunications industry, repairs frequently must be made to overhead lines by a technician operating from a ladder, lift bucket, sometimes during darkness and with adverse weather conditions such as precipitation, cold, and wind. Other repairs must be made in cramped conditions in underground vaults and cable lockers.

Fiber optic communication systems are also commonly used for process control, data, and voice communications in industrial and manufacturing facilities. In these venues, the immunity of optical systems to electronic and electromagnetically-induced noise and the elimination of electrical hazards are particularly beneficial. Cables in these locations are often routed through tight quarters, some in hazardous locations, making access for repair difficult. Communication systems on ships and in airplanes and spacecraft likewise advantageously employ fiber optic transmission; cable routing and access are often comparably problematic in these applications. In most of the aforementioned situations repair is further hampered because of the limited length of slack in the fiber that may be accessible for the technician to manipulate into a splicing device. The need for a system usable for making emergency repairs on fiber optic systems aboard military aircraft, ships, and submarines under operational or battle conditions is especially acute.

Together, these considerations call for splicing systems that are compact, portable, and able to be operated rapidly and reliably under adverse working conditions and with minimal slack cable. Moreover, it is desired that such a splicing system be capable of joining two fibers in a way that (i) causes minimal disruption or discontinuity in the optical transmission, (ii) does not adversely increase the diameter and volume of the cable, and (iii) has a durability as close as possible to that of an original fiber. Systems are also desired that are simple and reliable enough to be used by technicians who lack extensive training. There remains an urgent need for optical splicing systems that satisfy these requirements.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately-bonded layer termed a cladding and an outer layer called a buffer. The cladding, usually also glass, has an index of refraction lower than that of the core to insure that light is constrained for transmission within the core by total internal reflection. Typically the buffer is composed of plastic or polymer and serves to protect the inner layers mechanically and to prevent attack by moisture or other substances present in the fiber's environment. Commonly a plurality of individual fibers (in some cases as many as a thousand) constructed in this fashion are bundled together and enclosed in a protective jacket to form a cable.

Commonly used fibers may further be classified as multimode or single mode. Multimode fibers typically comprise cores having diameters of 50-62.5 µm but in some cases up to 100 µm. Single mode fibers generally have a much smaller core that may be 9 µm or less in diameter. The glass-cladding diameter is most commonly 125 µm but sometimes is 140 µm (with a 100 µm core). The exterior diameter is largely a function of the buffer coating, with 250 µm most common, although some fiber coatings may be as much as 900 µm in diameter. Alignment of fibers is a crucial part of the preparation for any splicing operation, but is especially challenging for single mode fibers that have small core diameter. In order to produce a high quality, low-loss splice, the two opposing ends to be joined must be aligned laterally to within a small fraction of the core diameter. Of course, the smaller the fiber diameter, the smaller the allowed deviation from perfect abutting alignment that may be tolerated.

Most fiber optic data transmission systems transmit information using electromagnetic radiation in the infrared band, including wavelengths such as 850 nm for multimode fibers and 1310 and 1550 nm for single mode fibers. The nomenclature "light" is invariably employed for this radiation, even though the cited wavelengths fall outside the range visible to humans.

Two general approaches for splicing optical fibers are in widespread use, viz. mechanical and fusion splicing. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. An adhesive is also commonly used. In some cases a transparent material such as a gel having an index of refraction similar to that of the fiber cores is used to bridge the gap between the fibers to minimize reflection losses associated with the splice. Mechanical splicing is conceptually simple, and minimal apparatus is required to effect splicing. However, even in the best case, a mechanical splice has relatively high and undesirable insertion loss, typically 0.20 dB. In addition, mechanical splices are generally weaker than the underlying fiber and are notoriously vulnerable to degradation of the optical quality of the splice over time, especially under adverse environmental conditions such as varying temperatures and high humidity. Mechanical splices are generally regarded as being temporary expedients at best and are not useful for high bandwidth systems or permanent joints.

Fusion splicing entails the welding of the two fiber ends to each other. That is, the ends are softened and brought into intimate contact. The softening is typically induced by a small electric arc struck between miniature pointed electrodes mounted in opposition and substantially perpendicular to the common axis of the fibers. Upon cooling, a strong, low-loss joint is formed. When properly carried out, fusion splices exhibit very low losses along with high stability and durability rivaling those of the uncut fiber. Mechanical protection is often provided by a heat-shrinkable tube applied over the completed joint. The tube replaces the buffer coating that generally must be removed prior to splicing. In many cases the heat-shrinkable tube is reinforced by incorporation therein of a length of metallic wire for stiffness.

One essential requirement for a low insertion loss splice is careful preparation and precise alignment of the ends of the fibers being joined. The axes of the fibers must be collinear within about 0.1 degree and aligned laterally within a small fraction of the core diameter to achieve the desired loss of less than about 0.03 dB. This required precision of alignment presents a substantial technical challenge, especially with single-mode fibers having cores approximately 9 µm diameter. Three general approaches have been proposed in the prior art. The simplest expedient is the use of mechanical fixturing, such as the alignment ferrules described above and other forms of pre-aligned V-grooves and the like. These purely mechanical approaches do not reliably produce splices that maintain less than 0.10 dB loss and so are ill suited for the demands of advanced, high-bandwidth communications systems. More sophisticated approaches employ some form of optically assisted fiber positioning. One such method is termed a profile alignment system (PAS). In this approach, the splicing apparatus incorporates an optical system that acquires images of the two fibers taken in two lateral directions, allowing the fibers to be positioned in two directions orthogonal to the mutual fiber axes. PAS systems may incorporate either manual positioning or may employ computerized image processing to optimize the alignment. However, the diffraction limit and pixel size of available electro-optic detectors restricts the precision achievable with PAS, even in systems based on visible light with wavelengths of about 400-700 nm. This particularly compromises the effectiveness of PAS in aligning small diameter, single mode fibers.

Still more advanced positioning methods have been proposed that employ measurement of actual light transmission between the fibers being joined. The positioning of the fibers is adaptively adjusted to maximize light transmission prior to the fusion operation. It is found that under carefully controlled laboratory conditions this approach may permit alignment better than that achievable with PAS systems.

However, the methods and apparatus for carrying out splicing aided either by the PAS or by transmission-based alignment techniques have heretofore not been well suited for use outside the laboratory or other similarly controlled workplace. The required equipment lacks the flexibility, versatility, and ruggedness needed for field use. Moreover, present equipment is cumbersome and not operable in the confined spaces frequently encountered during field service.

Notwithstanding numerous advances in the field of fiber optic joining, there remains a need in the art for an economical, efficient process for forming low-loss, durable, and reliable splices in fiber optic cables. Also needed is portable splicing equipment that can be operated by technicians without extensive training to accurately and efficiently join fiber optic cables in tightly confined spaces and under adverse environmental conditions.

SUMMARY OF THE INVENTION

The present invention provides a low profile system for joining optical fibers by fusion splicing. The system is preferably modular and low profile, enabling it to be used to form low transmission loss splices under difficult field conditions. The loss of spliced fibers is preferably minimized by use of automatically driven, active optical systems for adaptively aligning the cores of the two fibers prior to fusion. Such systems in some embodiments employ a profile alignment (PAS) system that employs a compact, imaging optical system incorporated in a fusion splicing head of the system. More preferably, embodiments of the system further incorporate a low profile local injection and detection (LID) system in carrying out the alignment. In the LID technique, optimal alignment is signaled by maximization of the transmission of light across the interface between the fibers. The LID system further allows the transmission loss of the spliced fiber to be accurately inferred.

In one aspect of the invention there is provided a low profile splicer system for joining a first optical fiber and a second optical fiber along a common fiber axis by fusion splicing. The system comprises a low profile fusion splicing head, a user interface, and electronic control circuitry. The splicing head employs a low profile fusion splicing head including a low profile fusion splicing stage having an electric arc welding system; a clamping and fiber position adjustment system comprising holding means for holding the fibers substantially in a horizontal plane and motion means for moving the fibers in three orthogonal dimensions into coaxial, abutting alignment; and an imaging optical system having a fiber imaging illuminator and a fiber image detector. The imaging optical system is adapted to acquire optical images of the fibers in a first imaging direction and a second imaging direction, the imaging directions being non-coincident. The user interface has an output display and user input controls for activating the splicing system. The electronic control circuitry comprises imaging electronics that receive the output of the fiber image detector and produce a display signal feeding the output display and fusion control electronics operably connected to activate the electric arc welding system and supply high voltage thereto.

In an aspect of the invention, the imaging optical system employs a fiber imaging illuminator comprising a first light source for the first imaging direction and a second light source for the second imaging direction; and a single image detector comprising a CMOS electro-optical device. Preferably the optical system has a compact, folded optical path to minimize the profile of the splicing stage and the splicing head. Light from the first source traverses a first optical path and light from the second source traverses a second optical path, each of the paths being multiply folded. The imaging optical system comprises optical elements located above and below the horizontal plane and the first and second optical paths lie in a plane perpendicular to the common fiber axis.

In some embodiments the system advantageously incorporates a profile alignment (PAS) system in communication with the fiber image detector and the motion means, and the PAS system is adapted to automatically command the motion means to bring the fibers into alignment prior to the fusion operation.

It is more preferred that the system employ a local injection and detection system in carrying out fiber alignment. In an embodiment of a LID-based system, the splicing head of the system includes a local light injector and a detector that provides an electronic intensity signal indicative of the fraction of the injected light propagated across the interface between the fibers; and the electronic control circuitry comprises: (i) a driver energizing the light injector, (ii) measurement electronics connected to the light detector receiving and processing the electronic intensity signal to provide a measured intensity signal, and (iii) a servo system operative to drive the motion means to maximize the measured intensity signal, whereby the relative position of the fibers is optimized prior to fusion.

The invention further provides a method for joining the fibers to produce a splice having low transmission loss. The method comprises: (i) providing a low profile fusion splicing system such as the aforementioned LID-based system; (ii) preparing the fibers by removing any coatings such as buffer or cladding layers thereon and cleaving the ends of the fibers to form a mating end on each; (iii) arranging the fibers in the splicing system's holding means with their ends in facing relationship; (iv) imaging the fibers prior to joining; (v) positioning the optical fibers into coaxial, abutting alignment; and (vi) fusing the fibers by electric arc welding. The optimization of fiber alignment of is preferably carried out using either a PAS or a LID system.

The present fiber splicing system is modular, compact, and low profile. By "low profile" is meant a system having a small extent in the vertical direction, i.e. the direction perpendicular to the plane in which the fiber path is located. Preferably, the vertical extent of the splicing system does not substantially increase as a result of the opening or closing of the components that must be carried out to situate the fibers for splicing with the splicing system it its operating location. That is to say, the vertical extent increases by at most about 2 mm as a result of opening the various clamping and holding components. As a result of the advantageous configuration and operation of the present apparatus, fiber splicing can be carried out under adverse environmental conditions and in cramped quarters. For example, the present invention is advantageously employed in installing, repairing, and maintaining commercial telecommunications cables, which often require a service technician to operate from a lift truck or in underground vaults or cable lockers, often in adverse weather and under poor lighting. The system is also useful for making emergency repairs of fiber optic systems aboard military aircraft, ships, and submarines under the especially acute challenges of operational or battle conditions.

The present system is easily modularized, with the fusion splicing head bearing only those components that directly impinge on the fibers being joined, with the associated control electronics, user interface and controls, and power supplies being connected but remotely located. In some embodiments these additional components are mounted on a belt or vest worn by an operator or otherwise conveniently disposed for portability.

Generally stated, the present system employs active optical techniques for aligning the fibers prior to fusion splicing. In one aspect of the invention, the system carries out this positioning using a profile alignment system (PAS). Suitable processing using a microprocessor or similar circuitry in the electronic control system infers the relative positions in three dimensions of the two fibers from images thereof acquired using the imaging optical system. Suitable electronic commands are issued to the motion means to bring the fibers into collinear alignment. Preferably the PAS system operates iteratively to effect the most precise alignment obtainable within the resolution of the optical system.

A higher precision of alignment is generally attainable using embodiments incorporating a local injection/detection system comprising a light injector and a light detector, collectively referred to hereinbelow as a "LID" system. More specifically, light emanating from a light source in the injector is coupled into a first optical fiber. The light propagates through the first fiber and a portion of it enters a second fiber that is to be joined to the first fiber. The lost light is deemed transmission loss. A portion of the light in the second fiber is then extracted and allowed to impinge on the light detector. The extracted light is received and detected by a light responsive element in the detector. The injection and extraction each occur at points at which the respective fibers are bent to a small radius of curvature. The intensity of the light present at the light responsive element is indicative of the attenuation of light in passing from the injection point to the extraction point. The attenuation is normally dominated by loss at the interface or joint between the fibers.

The present splicing system advantageously employs a LID system to effect optimal alignment of the fibers prior to the actual fusion splicing. The fibers are adaptively moved relative to one another to effect an alignment, which maximizes the transmission of light across the gap between the fibers prior to initiation of the fusion process. Comparison of the measured attenuation before and after fusion permits an approximate determination of the final insertion loss of the splice.

Advantageously, the present system in its various embodiments allows the fibers to be efficiently and precisely aligned prior to fusion. Accurate alignment advantageously results in a low-loss joint, i.e., a joint through which a light signal may propagate with its signal strength and integrity maintained, because the attenuation and back reflection attributable to the joint are rendered extremely low. Preferably, joints made with the present apparatus have an average loss of less than about 0.03 dB, and more preferably, an average of less than about 0.02 dB. Most preferably, every joint has a loss of less than about 0.02 dB.

In one aspect of the invention the LID system comprises a light injector having an injector base attachable to a substrate and a light detector having a detector base attachable to a substrate. The light injector preferably comprises (i) an opaque injector cover, at least a portion of which is slidably movable in a plane parallel to the injector base, the movable portion having an open position and a closed position, the open position permitting insertion of the first fiber into the injector; (ii) an injector window having a substantially planar entry face and a concave, arcuate exit face; (iii) an injector mandrel having a shape complementary to that of the exit face of the injector window, and being biased to clasp a portion of the first optical fiber in intimate contact between the injector mandrel and the exit face of the injector window, the injector mandrel being reversibly retractable from the exit face in response to motion of the injector cover from the closed position to the open position thereof; (iv) a light source positioned proximate the entry face of the injector window; and (v) optionally, a focusing lens near the exit face of the injector window onto which the fiber is pressed by the mandrel, whereby light emanating from the source passes through the injector window into the first buffer and thereafter into the first fiber core. The first fiber enters the injector in an entry direction and emerges from the injector in an exit direction, the entry and exit directions being substantially parallel. The first fiber traverses a path through the injector substantially in a plane, which is substantially parallel to the injector base.

The LID system further employs a light detector preferably comprising: (i) an opaque detector cover, at least a portion of which is slidably movable in a plane parallel to the detector base, the movable portion having an open position and a closed position, the open position permitting insertion of the second fiber into the detector; (ii) a detector window having a concave, arcuate entry face and a substantially planar exit face; (iii) a detector mandrel having a shape complementary to that of the entry face of the detector window, the detector mandrel being biased to clasp a portion of the second optical fiber in intimate contact between the detector mandrel and the entry face of the detector window, and the detector mandrel being reversibly retractable from the entry face in response to motion of the detector cover from the closed position to the open position thereof; (iv) a light responsive element to detect light emerging from the fiber, the light responsive element being positioned proximate the exit face, whereby light emanating from the buffer passes through the detector window into the light responsive element; and (v) optionally, an optical filter interposed between the detector window and the light responsive element. The second fiber enters the detector in an entry direction and emerges from the detector in an exit direction, the entry and exit directions being substantially parallel. The second fiber traverses a path through the detector in a plane, which is substantially parallel to the detector base.

High pass, low pass, and bandpass filter materials suitable for the optical filter used in the present LID detector are known in the optical materials art. Preferably an optical filter is selected that preferentially transmits light of the wavelength emitted by a LID injector associated with the LID detector but which strongly attenuates or blocks both extraneous ambient light and light of other wavelengths carried by the optical fiber. Use of such a filter material beneficially enhances the signal to noise ratio of the LID detection system.

The light source in the light injector is operably connected to, and energized by, a driver. A receiver determines the intensity of light incident on the light responsive element of the light detector. The LID system, along with the other components of the splicing system, is operable in any spatial orientation, facilitating the splicing system's use in awkward locations.

Preferably, the LID injector and detector are attached to a common substrate and oriented such that the supply ends of the first and second fibers enter the injector and detector, respectively, in directions that are substantially collinear. Likewise, the free ends of the fibers to be joined emerge from the injector and detector, respectively, along a common direction that is generally parallel the aforementioned supply direction and only slightly displaced therefrom. This disposition of the LID components allows the fibers to be inserted in the LID system despite the availability of only a minimum amount of free slack. As a result, the system is operable in close proximity to a wall, cable, conduit, or other location where fiber is present. By way of contrast, prior art systems have required much larger fiber loops with correspondingly more slack required and so were frequently not operable in tight quarters.

A number of structural and operational advantages are provided by the configuration of the present fiber splicing system and method. The arrangement of the fiber in the system is simple and direct, the path remaining substantially in a single plane parallel to the substrate on which the injector and detector are situated. Moreover, the path deviates from a straight line only insofar as necessary to provide sufficient bending to allow insertion and extraction of light for operation of the LID technique. As a result of this simple configuration and component design, the present LID-based fusion splicing system be operated in very restricted quarters, such as very close to a wall, ceiling, floor, or cable support structure such as a cable tray, and in circumstances wherein access and the amount of slack available for insertion of fibers into the system are strictly limited.

The present system is also simple to operate. In an aspect of the invention, the mounting of the fiber is accomplished simply. The fibers are easily inserted in the injector and detector devices, as each is preferably fully actuated by manipulation of its respective cover. Opening the cover retracts the corresponding mandrel, allowing the fiber to be inserted and properly situated; closure secures the fiber in its operational position. The preparation and dimensioning of the fibers is facilitated by using an offline preparation apparatus in which a fiber, premounted in the splicer's removable holding means, is temporarily placed. The simplicity of these operations allows them to be accomplished by workers who lack extensive training. Moreover, fiber can be mounted with a minimum of manual dexterity and manipulation, as well as in adverse conditions, such as bad weather or poor lighting, which make it difficult or impossible for the operator to see the equipment and the workpieces.

The utility of the present LID system is further enhanced in some embodiments by use of short wavelength light for the LID source, e.g. light having wavelength of about 850 nm, instead of the 1310 nm or other wavelengths typically used in previous alignment systems for fusion splicing. The shorter wavelength is advantageous for several reasons.

Available light sources operating at 850 nm are brighter and cost less. The 850 nm light is less attenuated by typical buffer coatings. In addition, interference in the LID detector from signals at 1310 or 1550 nm present in actively operating fibers is markedly reduced. In many cases these advantages also allow the LID system to be operated without the need for coupling gels previously required. The use of gels is inconvenient and further complicates the splicing process. Moreover, the mode field diameter of a fiber is slightly smaller at shorter wavelengths, improving the achievable precision of active core-to-core alignment.

The LID system used in the present fiber optic splicing system enables a better precision of alignment than attainable with other known joining apparatus, including those employing known profile alignment (PAS) systems. PAS systems are inherently diffraction-limited, and so cannot be made more precise than about the wavelength of the illuminating light, which is normally in the visible range of about 400-700 nm. This limitation, along with the pixel resolution of available electro-optic detector systems (typically of the order of 1 μm) poses a substantial problem when attempting to align small diameter, single mode fibers that are quite commonly used in advanced long-distance data transmission systems. By way of contrast, the present LID system is not so limited.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which:

FIG. 2b is a partially cutaway, plan view depicting the underside of the light injector shown by FIG. 2a;

FIG. 3b is a partially cutaway, plan view depicting the underside of the light detector also shown by FIG. 3a;

FIG. 5 depicts portions of the motion means and holding means also shown in FIG. 4;

FIG. 6b depicts in bottom plan view the actuator also seen in FIG. 6a;

DETAILED DESCRIPTION OF THE PREFERRED EMBODIMENTS

The present invention is directed to a compact, low profile apparatus and system for joining optical fiber waveguides to produce a durable fusion splice between a first and a second optical fiber. The joined fiber advantageously exhibits low attenuation. Advantageously the present system employs an adaptive technique to optimize the alignment of the fibers prior to fusion, whereby the insertion loss of the splice is minimized.

Figure 1:
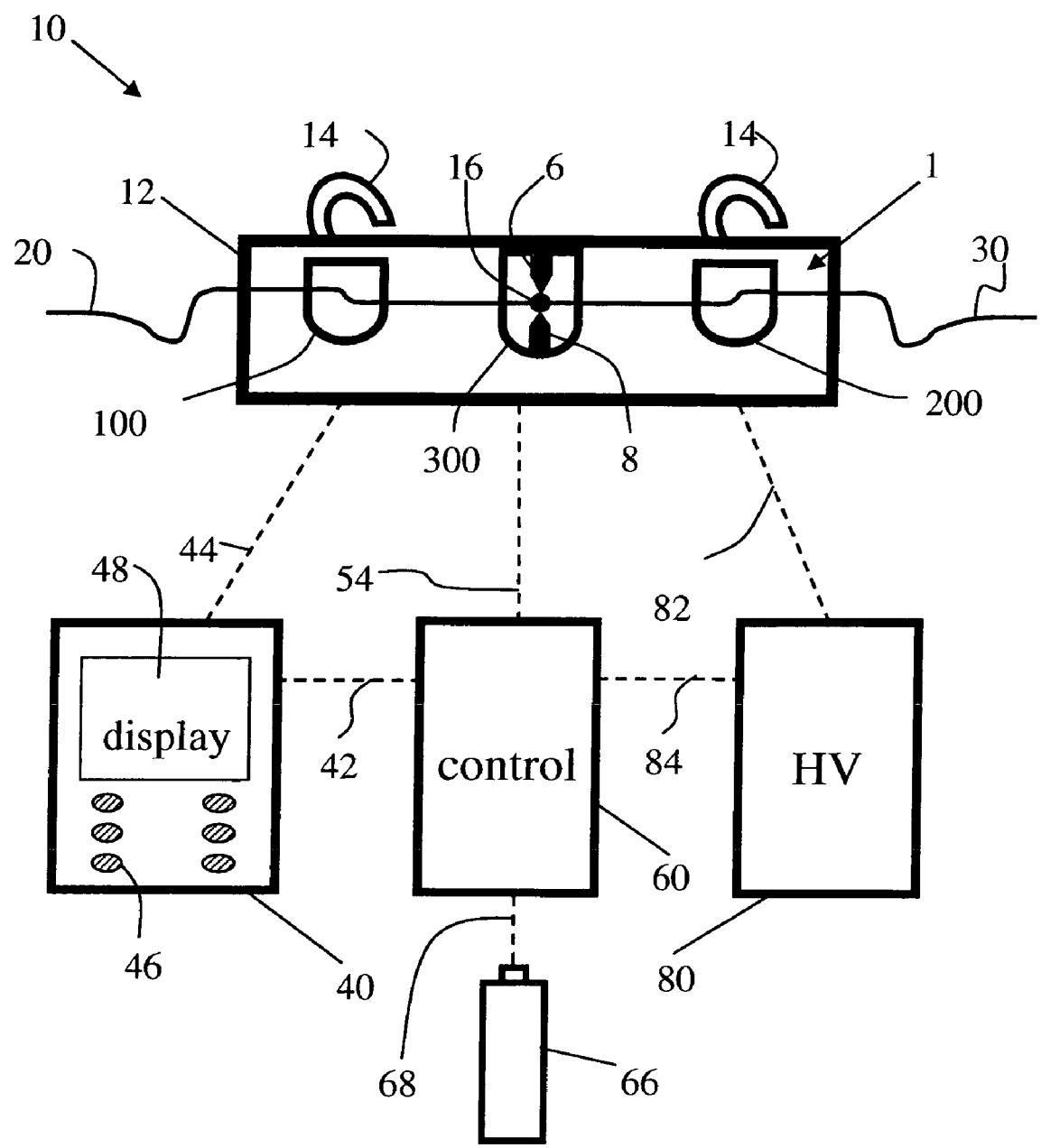
FIG. 1 is a top plan view schematically depicting a portion of a fusion splicing system incorporating one embodiment of the local injection and detection system of the invention.

Referring now to FIG. 1 there is depicted generally an implementation of a modular, low profile fusion splicing system 10 of the invention. Fusion splicing head 1 of the invention incorporates a local injection and detection system. First and second optical fibers 20, 30 are positioned in light injector 100 and light detector 200, aspects of which are depicted in greater detail by FIGS. 2A-2B and 3A-3B, respectively. The free ends of the fibers 20, 30 appointed to be joined are situated in facing, collinearly aligned relationship in fusion splicing stage 300, which is further depicted by FIGS. 4-5. Activation of an electric arc between front electrode 6 and rear electrode 8 causes local softening of each end of fibers 20, 30, allowing the ends to be welded, forming joint 16. Elements of fusion splicing head 1 are mounted in housing 12, which has hooks 14 for hanging head 1, e.g. in a convenient location for carrying out field service operations. It will be appreciated that support means other than hooks 14 may also be employed, such as VEL-CRO™ attachment, brackets, support stands, and the like. The supply ends of the fibers 20, 30 enter injector 100 and emerge from detector 200 in substantially collinear directions. The design of splicing head 1, including both the configuration of injector 100, fusion stage 300, and detector 200, and the path of the fibers 20, 30 through the system, is simple, allowing a splicing system comprising head 1 to be used for joining fibers in close proximity to walls, ceilings, cable support structures, and the like. This functionality is enhanced by a compact and low profile design for splicing head 1. By "low profile design" is meant a design wherein the extent of the splicing head in a vertical direction perpendicular to the plane of the head is small and not substantially increased by opening and closing injector 100, detector 200, and the clamping means of fusion stage 300.

The embodiment of the splicing system depicted by FIG. 1 comprises additional modules housing a user interface 40, a control unit 60, and a high voltage supply 80, all powered by a power source such as rechargeable battery pack 66. In one aspect of the invention, these modules are housed in separate enclosures, allowing the major components of the system except for fusion head 1 to be mounted on a belt or vest conveniently worn by a system operator. Locating components of the splicing system that are not required to be proximate the actual fibers in other housings advantageously permits the fusion head 1 to be made small in size. As a result, the present system is highly suited for field service splicing applications that often arise in restricted quarters. Operation and automatic sequencing of the splicing operations are carried out through control module 60, which preferably comprises a microprocessor and electronics associated with the operation of the LID system and analysis of data provided by one or more cameras in head 1. In the depicted embodiment rechargeable battery pack 66 connected to control unit 60 by cable 68 provides power needed for all the control and operational functions of system 10. However, the unit may also be powered by any other source of electrical energy, such as energy from the conventional 120/240 VAC mains or a vehicle-mounted or freestanding generating system or battery pack of known form for field service applications. Control signals and data are exchanged by control unit 60 and head 1 through cable 54. Interface 40 includes a versatile visible display 48, on which may be depicted at various times a menu of user options, a report of data collected in the course of a splicing operation, setup and calibration information, and a magnified display of one or more views of the fibers in the vicinity of splicing stage 300. The user enters commands in a familiar way to operate the splicer. In some embodiments, each button is dedicated and labeled with a corresponding function, which might be "CLEAN," "UP," "DOWN," "ENTER," "EXIT", "ON/OFF," or other similar functions. In other embodiments, the display is used to provide a context-sensitive, hierarchical choice of menu commands which are activated using familiar touch screen functionality. High voltage supply 80 provides the potential needed to strike an electric arc between electrodes 6 and 8 of splicing stage 300. Interface 40 may communicate bidirectionally with splicing head 1 through cable 44 and with control unit 60 through cable 42. One of ordinary skill in the relevant art will recognize that in other embodiments the components needed to carry out the various functions associated with user interface 40, control unit 60, high voltage supply 80, and battery pack 66 may be disposed in more or fewer housings than are shown by FIG. 1. Moreover, the wiring required for the operable interconnection of the system's components may be provided using a variety of cabling arrangements. For example, individual cables may connect splicing head 1 with interface 40 and high voltage supply 80, respectively, as shown by FIG. 1. Alternatively, these connections may be shared in a single cable, such as a single cable between control unit 60 and splicing head 1. As an alternative to conductive wiring, optical fiber or wireless interconnection is optionally used for some or all of the control and data functions.

Other embodiments of the system incorporate further data and communication elements, such as storage of a log memorializing routine calibrations, splicing events and data associated therewith, such as insertion loss and positioning information, and images of the spliced fiber. Such information is optionally printed by a printer associated with user interface 40 in a conventional manner or uploadable to a computer by wired or wireless interface protocols known in the art or by storage in a writeable data storage means. Such storage may be implemented using any form of semiconductor, magnetic, or ferroelectric computer memory or the like or by a removable mass storage medium such as a magnetic or optical disk, flash memory modules, or other known removable semiconductor, magnetic, or ferroelectric memory modules.

Figure 4:
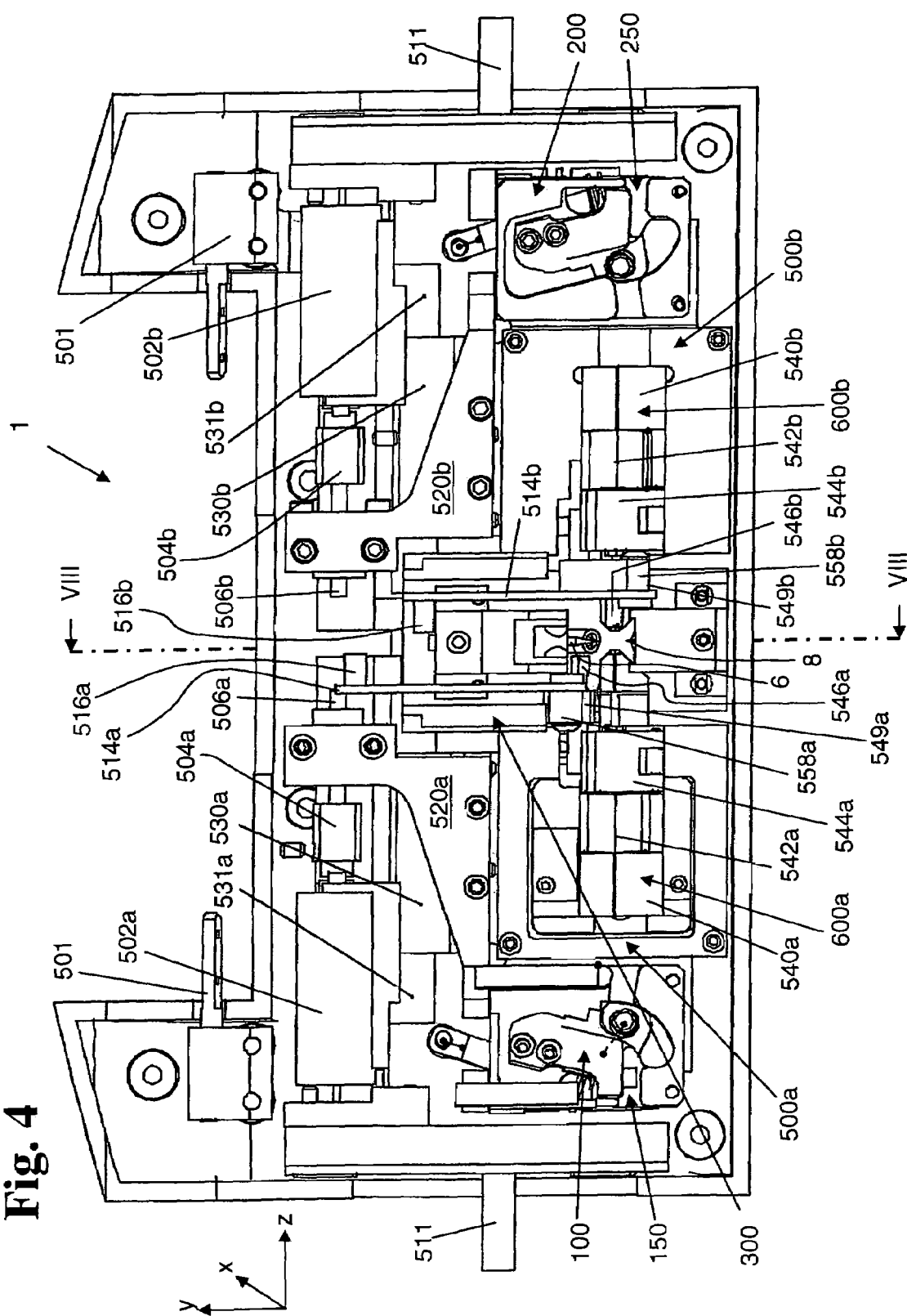
FIG. 4 depicts in top plan view a fusion splicing stage used in the present system and incorporating electric arc fusion electrodes, a fiber clamping and micropositioning system, and an optical system for visualizing fibers being spliced.

Fusion splicing head 1, which is depicted in greater detail by FIG. 4, includes light injector 100, light detector 200, and fusion splicing stage 300. A first fiber is held by removable first clamp assembly 600*a*, which includes flat portion 540*a*, aligning V-block 542*a*, and first fiber clamp 544*a* openable at pivot 545*a*. The vertex of V-block 542*a* and the flat surfaces of flat portion 540*a* and clamp 544*a* are coplanar. A second fiber is held by removable second clamp assembly 600*b*, including flat portion 540*b*, aligning V-block 542*b*, and second fiber clamp 544*b* openable at pivot 545*b*. Second clamp assembly 600*b* is generally a mirror image of assembly 600*a*.

In carrying out a fusion splicing operation, first clamp assembly 600*a* is preferably removed to a convenient location and first fiber clamp 544*a* is opened by rotating it about pivot 545*a* at a side lateral to the fiber path defined, e.g., by the V-groove of block 542*a*. The first fiber is then secured by closing first clamp 544*a*. Flat portion 540*a* provides a suitable place for the operator to place his/her thumb to temporarily stabilize the fiber during this operation. The fiber is thereafter prepared by removing a requisite portion of the buffer and cladding, if present, and cleaving the fiber to provide a mating surface that is clean, flat, and perpendicular to the fiber axis, and thus suitable for fusion joining. Preferably the underside of first clamp assembly 600*a* is provided with fiducial alignment pins permitting it to be reproducibly located in both splicing head 1 and in an auxiliary preparation apparatus used for the aforementioned buffer and cladding removal and fiber cleaving. Advantageously such a preparation apparatus allows the axial extent of buffer/cladding removal and the length of fiber projecting from the fiber clamp 544*a* end of clamp assembly 600*a* to the mating surface to be established reproducibly. After fiber preparation, first clamp assembly 600*a* bearing the first fiber is replaced in head 1. A similar operation is preferably carried out to mount and prepare second fiber 30 in second clamp assembly 600*b*.

The use of an auxiliary, offline fiber preparation and mounting apparatus in conjunction with the present splicing system is especially advantageous for field operations, since the fiber ends can be prepared and dimensioned and accurately placed in the splicer under conditions in which limited visibility, difficult working conditions, or insufficient clearance hamper the dexterity of a splicing technician. By way of contrast, previous splicing systems typically have relied on the skill of the technician in preparing the configuration of the fiber to be joined and in placing it accurately in the system.

After both fibers have been prepared and the respective clamp assemblies holding them have been replaced in splicer head 1, the distal ends of the fibers that emerge from the flat portion end of the clamp assembly, e.g. from the flat portion 540*a* end of system 600*a*, are mounted in injector 100 and detector 200.

Preferably the free ends of both fibers are further secured as close to the joint location as possible to prevent vibration and movement after completion of alignment and during the welding process. In the embodiment of FIG. 4, the two fibers are respectively secured using flat portions 546*a* and 546*b* of movable joint clamps. The flat portions 546*a* and 546*b* mate with complementary end portions of positioners 500*a*, 500*b*, respectively, to create a mild pinching action capturing the fibers. The ends of the positioners are provided with precision V-grooves 565*a*, 565*b* that precisely and reproducibly locate respective fibers 20, 30. Each of the movable joint clamps pivotally attaches to its corresponding positioner 500*a*, 500*b* at pivot mounts 563*a*, 563*b*, respectively. Opposite flat portions 546*a*, 546*b*, on the joint clamps are respective bifurcated portions 549*a*, 549*b*, which engage rotatable sleeves 558*a* and 558*b* mounted on one end of actuator linkages 514*a*, 514*b*. In the depiction of FIG. 4, for illustrative purposes linkage 514*a* and flat portion 546*a* are shown in retracted, open position, while linkage 514*b* and flat portion 546*b* are shown in closed position. In addition a slidably movable fusion cover of fusion stage 300 has been removed for clarity. It will be understood that in normal operation, attachments 516*a* and 516*b* at the ends of linkages 514*a* and 514*b* opposite sleeves 558*a* and 558*b* are attached to the same movable fusion cover. Moving the cover operates both linkages 514*a*, 514*b* and both flat portions 546*a*, 546*b* conjunctively. When the cover is in the rearward, open position, access for inserting the fiber into the fusion stage and its joint clamps is provided; in the cover's closed position, the joint clamps are closed to secure the fibers preparatory to fusion. Preferably the cover is opaque to reduce light interference with the operation of the fiber imaging optical system.

Fusion head 1 further comprises mechanical motion means for actively aligning the fibers prior to fusion. In the embodiment of FIG. 4, the vertices of V-blocks 542a, 542b passively establish approximate fiber alignment in both the x and y directions, which are transverse to the common fiber axis. Precision V-grooves 565a and 565b further passively locate and secure the fibers at a point close to the splicing location. Active positioning is further carried out in both transverse (x,y) and axial (z) directions using a combination of motor and piezoelectric drives. More specifically, rough axial positioning is effected by independently operable stepper motors 502a, 502b. The motors are coupled by couplings 504a, 504b to lead screws 506a, 506b, which in turn rotate to drive carriages 520a and 520b on which are mounted piezoelectric manipulators 500a, 500b. Carriages 520a and 520b ride on slide bars 531a and 531b with interposed bearings 530a and 530b, respectively, to provide smooth, low friction travel. Suitable actuation of motors 502a and 502b thus permits the fibers, which are secured by fiber clamps 600a, 600b to piezoelectric manipulators 500a, 500b, to be moved axially into approximate abutment. Independent motion of the two motors permits the point of abutment to be located symmetrically along an imaginary line connecting electrodes 6, 8, for optimal arc welding. Direct drive of carriages 520a, 520b advantageously eliminates the backlash and other similar imprecision that normally attends gear-driven motion systems such as those frequently employed in prior art splicers. In addition, a direct drive system is more compact, simpler, and far less prone to breakdown. Together, these factors contribute to the ruggedness and portability of the present system.

More precise alignment of the fibers is preferably carried out using piezoelectric drives 500a and 500b, best visualized by reference to FIG. 5. In the embodiment shown, drive 500a provides, y-axis transverse motion and z-axis axial motion, while drive 500b provides transverse, x-axis motion. While one skilled in the art will recognize that analysis and alignment is simplest in a system with drive capabilities in three orthogonal directions, it will also be appreciated that any system capable of providing sufficient motion in three non-collinear directions can bring fibers into proper alignment. Other system embodiments optionally permit each of the fibers to be moved independently in three dimensions, but apportioning three directions over two positioners, one for each fiber, as in the embodiment of FIGS. 5-7, will be recognized as sufficient for fiber alignment. The analysis is facilitated by selecting imaging directions that are transverse to the fiber axis and mutually orthogonal. However, known mathematical transformations can be used to provide the requisite positioning information as long as the imaging directions are not coincident. The alignment process is further facilitated by selection of positioning motions that are also transverse and mutually orthogonal.

Figure 6A:
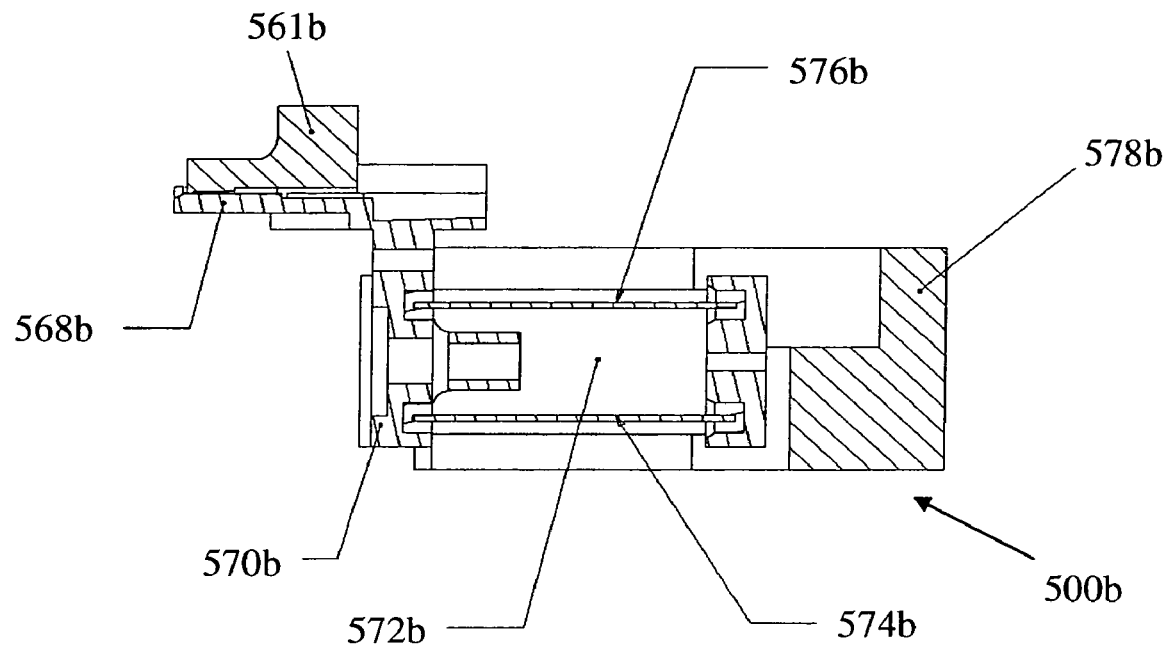
FIG. 6a depicts in side elevation view a piezoelectric actuator that is used in the motion means in one embodiment of the invention to provide two orthogonal transverse motions for the fiber being spliced.
Figure 6B:
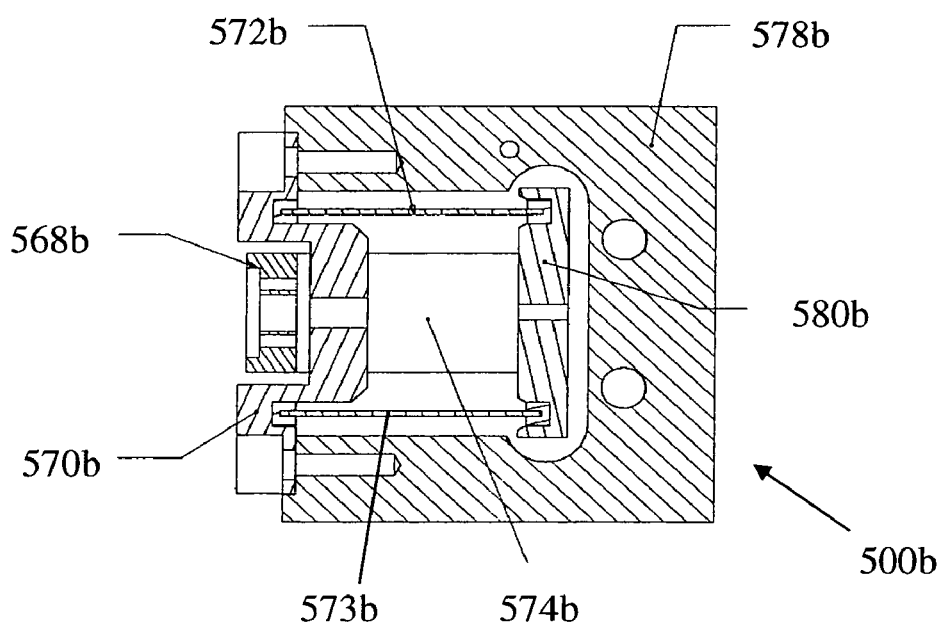
Figure 7:
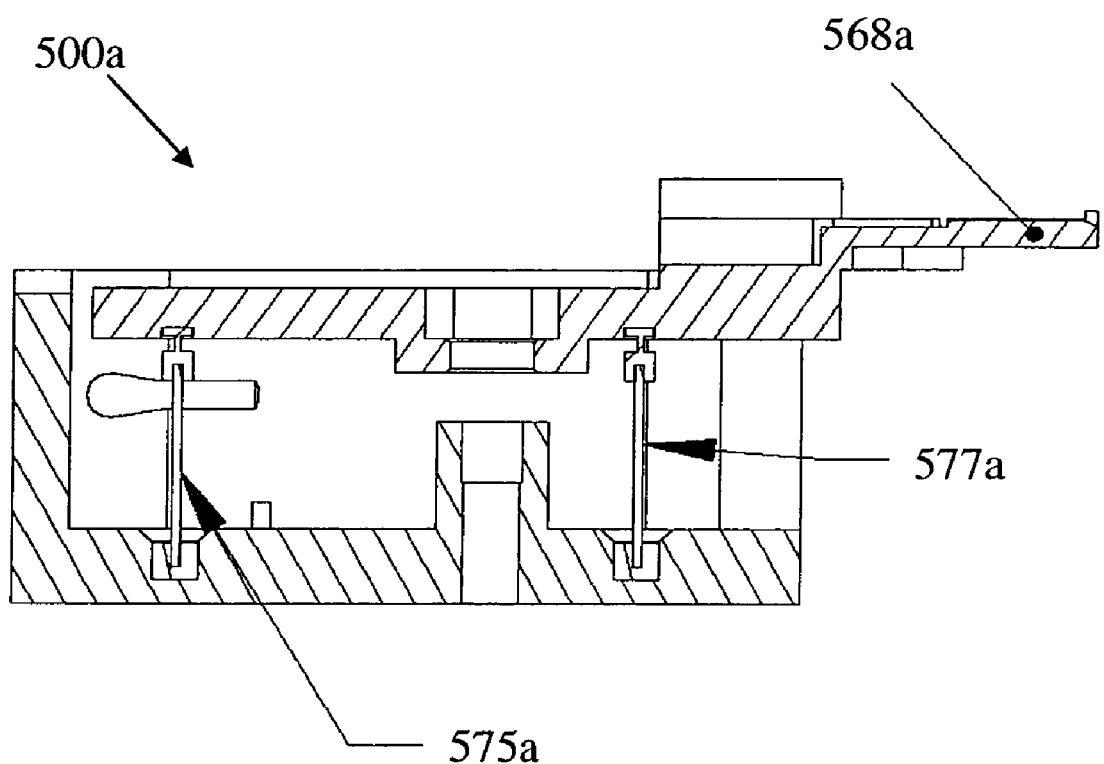
FIG. 7 depicts in side elevation view a piezoelectric actuator that is used in the motion means in one embodiment of the invention to provide axial motion for the fiber being spliced.

Referring now to FIGS. 6-7 the operation of piezoelectric drives 500a and 500b in one embodiment may be visualized. FIGS. 6a and 6b show right piezoelectric drive 500b that provides transverse actuation of fiber 30 in two orthogonal transverse directions. Fiber 30 (not shown) is secured between fiber clamp 561b and fiber guide 568b and coupled to the active elements by piezoelectric mount 570b and interstage clamp 580b in housing 578b. First and second y-direction piezoelectric bi-morphs 574b and 576b form a couple to deform to produce y-axis motion, while the couple of piezoelectric bi-morphs 572b and 573b provide x-axis motion. FIG. 7 illustrates left piezoelectric drive 500a in which fiber 20 is mounted between fiber guide 568a and a fiber clamp (not shown). Piezoelectric bi-morphs 575b and 577b provide axially directed (z) motion.

While the stepper motors and piezoelectric actuators depicted in FIGS. 5-7 are presently preferred for the motion means of fusion stage 300, other forms of pneumatic and electromechanical actuators capable of producing the requisite extent of linear or rotary motion may also be used in practicing the present invention.

The optical imaging system of stage 300 preferably comprises a light source and detector for acquiring images of the joint area from two non-collinear directions. Preferably, the directions are mutually substantially orthogonal and perpendicular to the fiber axis. As best visualized in the cross-sectional view of FIG. 8, a first optical path is defined by emission of back light from front source 302 of backlighting, mounted in front lamp housing 303, which illuminates the area of joint 16. Light then passes through rear lens 324 mounted in a rear lens holder 326, and successively reflects from rear fold mirror 328 and refracts through rear prism 329 before downwardly impinging the active area of camera 314. A second optical path is defined by emission of light from rear source 320, mounted in rear lamp housing 321, which illuminates the area of joint 16, and subsequently passes through front lens 306 mounted in a front lens holder 308, and successively reflects from front fold mirror 310 and refracts through front prism 313 before downwardly impinging on camera 314. The images captured by camera 314 are magnified by the lenses and optical system design, preferably at least about 10×, and more preferably, at least about 20×. Preferably, a plurality of tilt adjustment screws 319 secures each of mirrors 310 and 328, whereby the optical system can be brought into alignment and secured so that images of the optical fibers in two substantially orthogonal directions are captured in different portions of the active area of camera 314. The first and second optical paths preferably lie in a plane normal to the common fiber axis and passing through the point of abutment of the fibers.

Figure 8:
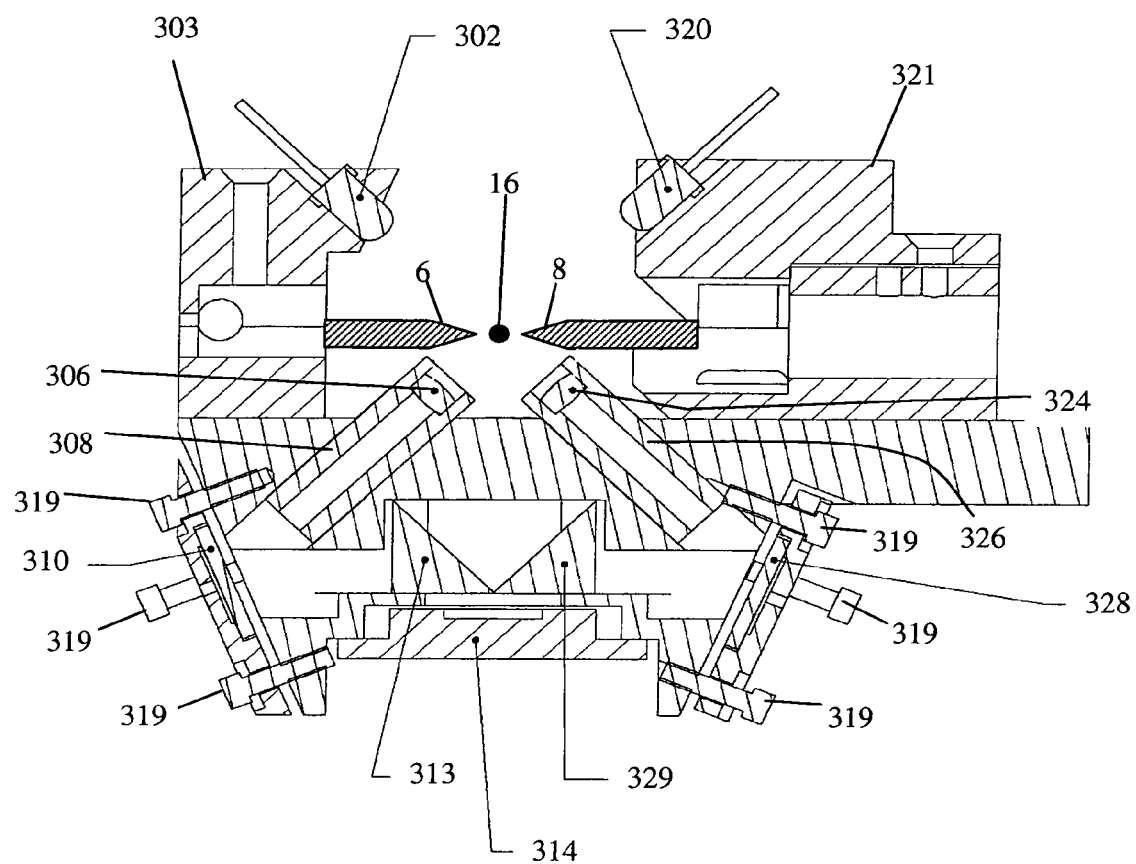
FIG. 8 depicts in cross-section view at level VIII-VIII the splicing stage also included in the embodiment of FIG. 4.

In the optical system depicted by FIG. 8, some of the elements in each optical path are located above the fiber plane, and some are below. In addition, each optical path is multiply folded. That is to say, the path includes plural, non-collinear segments, that multiply change direction as a result of the reflective or refractive elements within the path. More specifically, sources 302 and 320 are located above the fiber plane, i.e., a horizontal plane traversed by the fibers mounted in the LID detector and injector and splicing stage. The remaining optical components, including lenses, mirrors, prisms, and reflectors, and camera, are below the fiber plane. The optical system depicted by FIG. 8 is advantageously compact as a consequence of its multiply-folded optical paths which: (i) lie in a plane perpendicular to the common fiber axis at the location of the fusion joint and (ii) penetrate the fiber plane. Advantageously the plane of the optical paths also contains the electrodes 6, 8 of the welding system, minimizing parallax distortion of the fibers near the ultimate joint location. In addition, the optical system employs a single camera 314, which may be any suitable electro-optical image detector having the requisite size, sensitivity, and resolution, but is preferably a charge-coupled or CMOS device. Images of the fiber in substantially orthogonal directions are projected onto different sections of the camera's sensitive area. The camera is connected to suitable analog or digital electronic processing circuitry that produces an image that may be displayed in real time on display 48 in the user interface unit 40. The processing optionally includes image enhancement and processing using known image improvement techniques.

The acquired fiber images are optionally used as input to a PAS system which carries out an adjustment of fiber positioning. Known electronic image analysis techniques, preferably implemented using a microprocessor or comparable circuitry in control unit 60, are used to ascertain the condition and relative orientation and position of the respective ends of the two fibers. The circuitry then adaptively commands the positioning system in head 1 to move the fibers into approximate coaxial alignment and abutment. The PAS system preferably operates iteratively to bring the fibers into as accurate alignment as the diffraction limit and resolution of the imaging optics permit. After PAS alignment is completed, the fibers have sufficient optical coupling for a LID system to function.

Figure 2A:
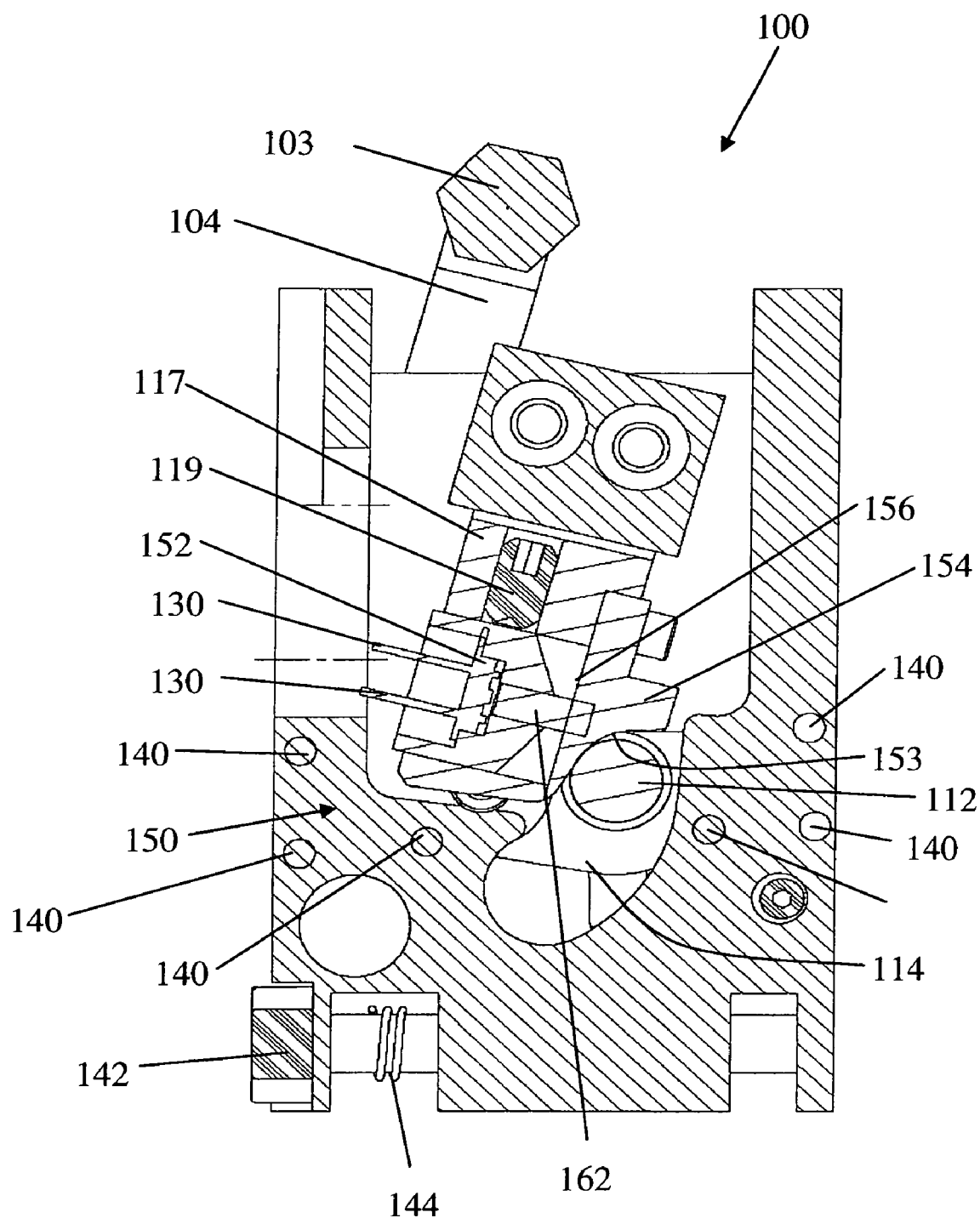
FIG. 2a is a partially cutaway, plan view depicting the top side of a light injector used in the present system.
Figure 2B:
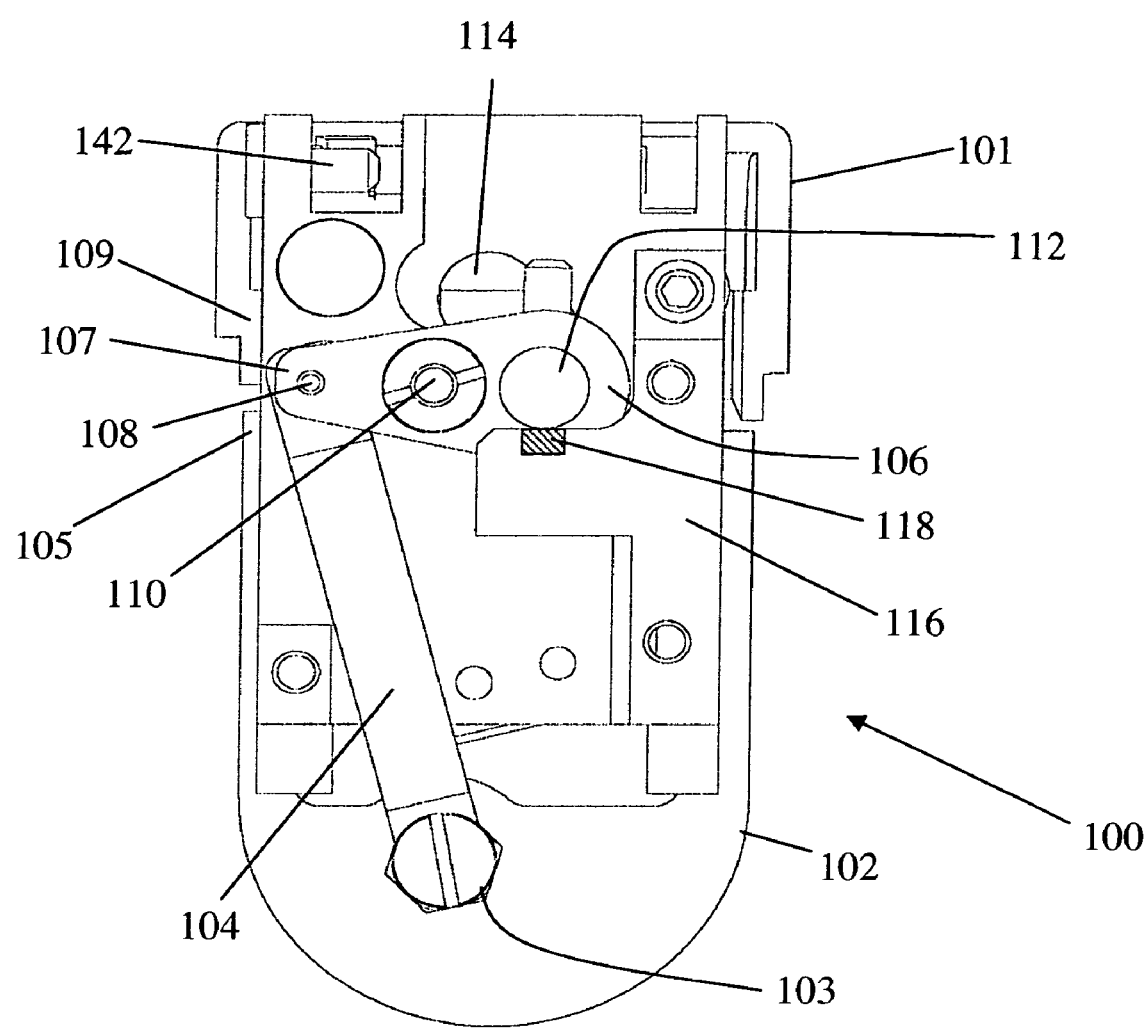

Referring now to FIGS. 2A-2B there is depicted one form of a low profile LID injector 100 for injecting light into an optical fiber waveguide 20. Injector 100 is mountable on a substrate and is covered by a fixed cover portion 101 and a slidably movable cover portion 102. Movable portion 102 has peripheral splines 105 on each side as partially shown by FIG. 2A which engage complementary slots 109 in fixed portion 101 to maintain linear alignment of the portions 101, 102 during the motion of movable cover portion 102. As best visualized by reference to FIG. 2B, opening movable cover 102 of injector 100 retracts injector mandrel 112. Retraction of mandrel 112 also allows access to fiber path 150, as depicted by FIG. 2A. Closing cover 102 returns mandrel 112 to bear on fiber 20, which is thereby grasped between arcuate, concave surface 153 of injector window 154 and the upper portion of mandrel 112. Cover 102 actuates mandrel 112 through the action of a mechanical linkage comprising crank actuator 104 and crank 106. One end of crank actuator 104 is attached by a screw 103 to a threaded boss on the underside of cover 102. The other end of crank actuator 104 is rotatably attached by pin 108 to clevis 107 at one end of crank 106. Crank 106 is pivotally attached at a point intermediate mandrel 112 and pin 108 by a screw 110 to a boss on the underside of optics mount 116. Mandrel 112 is disposed in a hole at the end of crank 106 opposite clevis 107. The opening and closing of cover 102 thereby moves mandrel 112 through mandrel guide slot 114 in mount 116. Mandrel 112 is preferably composed of a ferromagnetic material, such as a magnetic stainless steel. When cover 102 is in the closed position, the lower portion of mandrel 112 is proximate one or more permanent magnets. Mandrel 112 acts to close the magnetic circuit formed in cooperation with the magnets. The resulting attractive force acting on mandrel 112 is communicated through crank actuator 104 and crank 106 to urge cover 102 into closed position.

In the closed position, movable cover portion 102 and fixed cover portion 101 cooperate to shield the components of LID injector 100 from externally incident light. However, light generated by injector light source 152, which is electrically energized through leads 130, is focused by a lens and then enters and passes through entry surface 156 of injector window 154, emerges through concave surface 153 of window 154, and enters fiber 20 through the buffer coating thereof in the portion of the fiber bent and held in conformity to surface 153 by mandrel 112. Preferably concave surface 153 and mandrel 112 have complementary shape. Disposition of fiber 20 in clasping contact between arcuate surface 153 and mandrel 112 deflects fiber 20 sufficiently for light from source 152 incident on the buffer jacket of fiber 20 to be injected into the fiber core for propagation therethrough. Preferably the focusing lens is in the form of a right circular cylinder of glass having a radially graded refractive index and is disposed with its cylindrical axis substantially coincident with the optical path. One form of such lenses is sold commercially by Nippon Sheet Glass under the tradename "SELFOC." However, lenses of other known types, including conventional convex lenses composed of conventional optical materials may also be used in constructing the optical system of the present injector.

Light source 152 may comprise any means of illumination but preferably comprises a light emitting diode (LED). A semiconductor laser or other suitable light source may also be used. The use of a source that emits at a short wavelength (e.g. a wavelength ranging from about 800 to 900 nm, and preferably about 850 nm) is preferred, as discussed in greater detail hereinabove.

Figure 3A:
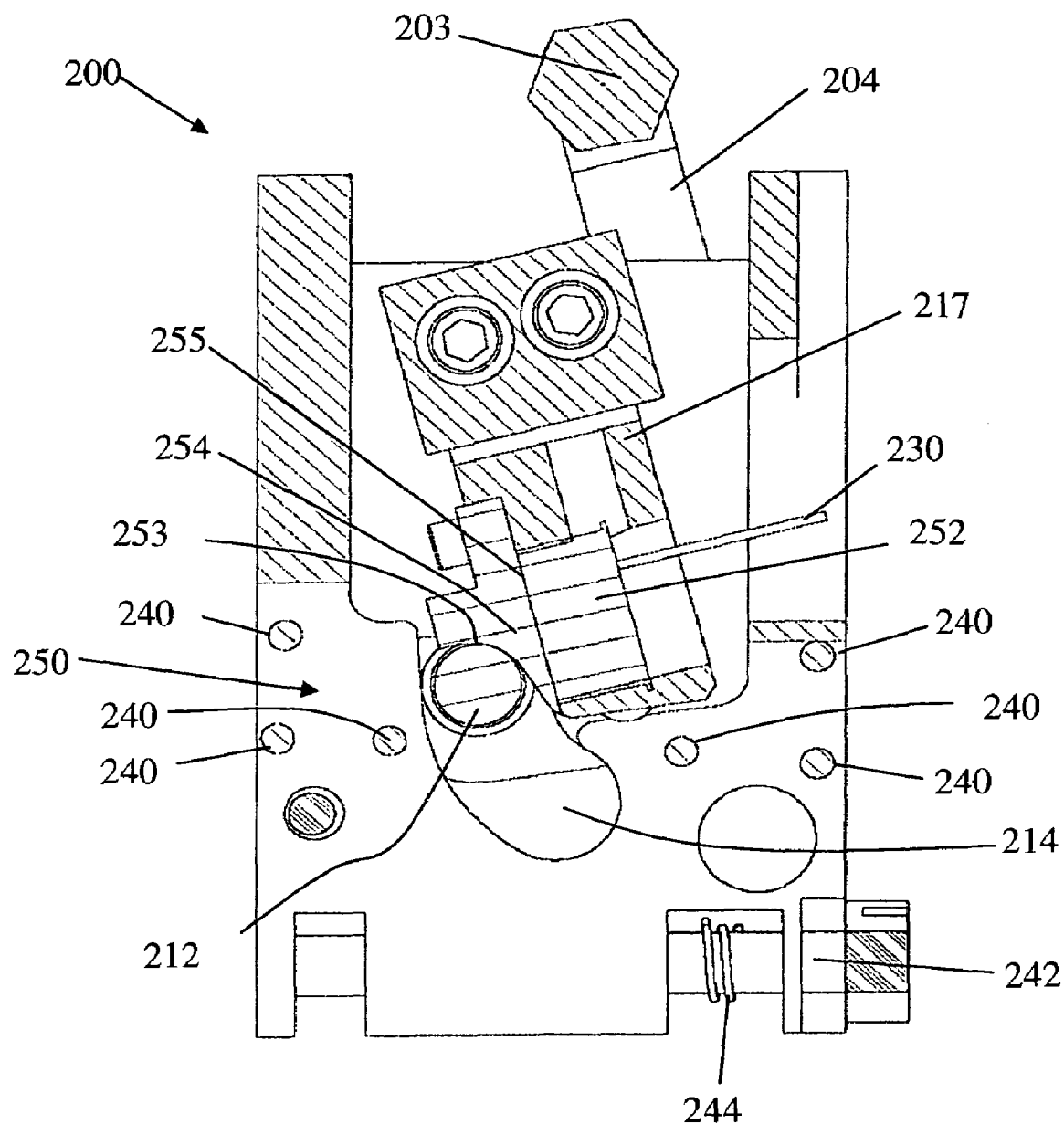
FIG. 3a is a partially cutaway, plan view depicting the top side of a light detector used in the present system.
Figure 3B:
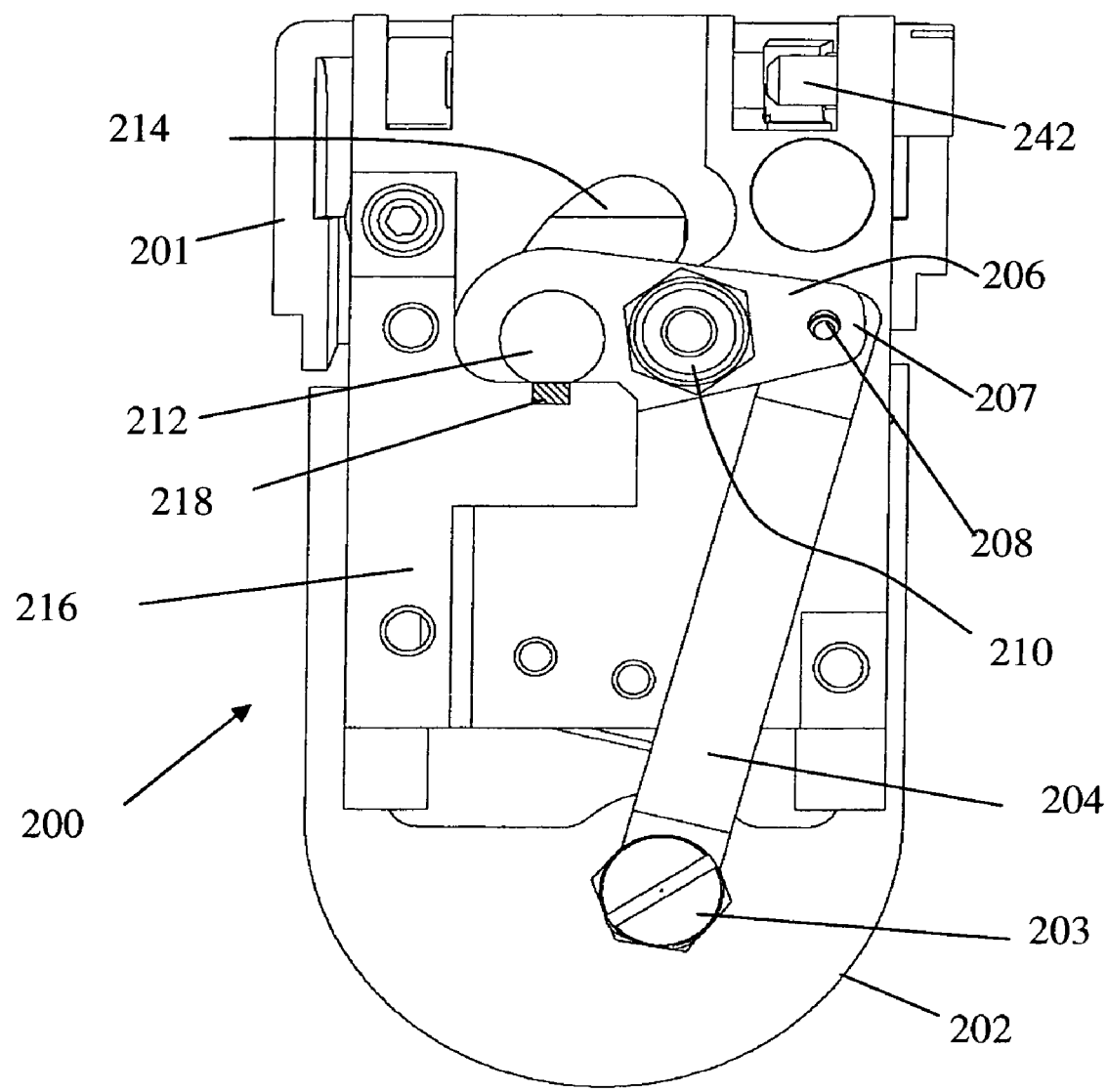

FIGS. 3A-3B depict a LID detector 200 of the invention. LID detector 200 corresponds to LID injector 100 depicted by FIGS. 2a-2b and is similar in structure, mechanical operation, and engagement of an optical fiber passing through it. A light responsive detection element replaces light source 152 of injector 100. Preferably detector 200 has a structure which is generally a complementary, mirror image of injector 100 so that a LID system comprising both has improved compactness.

More specifically, in FIGS. 3A-3B there is depicted one form of a low profile LID detector 200 for injecting light into an optical fiber waveguide 30. Detector 200 is mountable on a substrate and is covered by a fixed cover portion and a slidably movable cover portion. Peripheral splines on each side of the movable cover engage complementary slots to assure that the cover portions remain aligned during actuation of the movable cover portion. Opening the movable cover of detector 200 retracts detector mandrel 212, allowing access for placing fiber 30 into fiber path 250. Closing the movable cover returns mandrel 212 to bear on fiber 30, which is thereby grasped between arcuate, concave surface 253 of detector window 254 and the upper portion of mandrel 212. The movable cover actuates mandrel 212 through the action of a mechanical linkage comprising crank actuator 204 and crank 206. One end of crank actuator 204 is attached by a screw 203 to a threaded boss on the underside of the movable cover. The other end of crank actuator 204 is rotatably attached by pin 208 to clevis 207 at one end of crank 206. Crank 206 is pivotally attached at a point intermediate mandrel 212 and pin 208 by a screw 210 to a boss on the underside of detector optics mount 216. Mandrel 212 is disposed in a hole at the end of crank 206 opposite clevis 207. The opening and closing of the movable cover thereby moves mandrel 212 through detector mandrel guide slot 214 in mount 216. Mandrel 212 is preferably composed of a ferromagnetic material such as a magnetic stainless steel. When the cover is in the closed position, the lower portion of mandrel 212 is proximate permanent magnets which are disposed in blind holes in detector optics mount 216. Mandrel 212 acts to close the magnetic circuit formed in cooperation with the magnets. The resulting attractive force acting on mandrel 212 is communicated through crank actuator 204 and crank 206 to urge the movable cover into closed position.

In the closed position, the movable and fixed cover portions cooperate to shield the components of LID detector 200 from externally incident light. However, a portion of this light propagating through fiber 30 is extracted therefrom at a bend in fiber 30 at the location where fiber 30 is clasped between mandrel 212 and concave surface 253. The extracted light passes through the buffer of fiber 30 and enters window 254 through entry surface 253. Light emerges from window 254 through exit surface 255.

A light responsive element abutting exit surface 255 of window 254 may comprise any electronic element whose electrical characteristics change in response to the incidence of light thereon. Preferably the light responsive element comprises a phototransistor, Si or InGaAs PIN diode, avalanche photodiode (APD), or other element electrically responsive to light of the wavelength emitted by light source 152. A Si PIN diode is preferred for its availability, low cost, low noise, and immunity to radiation of wavelength longer than about 1050 nm.

It is also preferred that a filter that substantially transmits the light from source 152 but excludes other wavelengths be interposed between surface 255 and the light responsive element.

Embodiments employing 850 nm LID are advantageously employed in splicing fiber systems appointed to transmit data using longer wavelength light, e.g., 1310 or 1550 nm light. Properly chosen filters then exclude the data light from the LID detector. In such systems, a Si PIN diode LID detector is preferred as being strongly responsive to 850 nm LID light but not to 1310 or 1550 nm light.

LID injector 100 depicted by FIGS. 2A-2B and LID detector 200 depicted by FIGS. 3A-3B are advantageously used in a compact, low profile, modular fiber optic splicing system. Each of injector 100 and detector 200 is operated by sliding its respective cover to the open and closed positions. The simplicity of these operations allows optical fiber to be easily placed within the unit and subsequently removed after the splicing operation is completed. The LID system is employed by the splicing system to achieve proper of the alignment of the fibers so they may be joined in a joint that exhibits minimal insertion loss. The aforementioned LID injector and detector system advantageously contributes to the design and operation of a fusion splicing system that is thereby compact, portable, and easily operated even under adverse environmental conditions and in cramped quarters. Additional forms of low profile LID systems are disclosed in copending application bearing Ser. No. 10/806,538, which is filed of even date herewith, commonly assigned, and incorporated herein in the entirety by reference thereto.

The LID system provides a signal indicative of the intensity of light in the second fiber that has been injected by LID injector 100 into the first fiber and propagated across the interface therebetween. A light responsive element in LID detector 200 senses the propagated light. The output of the element is fed to suitable electronic circuitry incorporating amplification and filtering to produce a measured signal used as feedback to drive a servo system to bring the fibers into fine alignment in three dimensions. Optimized alignment, which is signaled by a maximum in the transmitted light intensity, is essential in forming a durable fusion splice with minimal or no insertion loss. The LID system additionally provides a method for inferring the actual insertion loss of the spliced fiber by comparison of the transmission between the fibers before and after splicing. The theoretical loss due to the interface between two fibers having index of refraction of about 1.4 is estimated to be about 0.36 dB. Thus, the increase in transmission after splicing is decremented by 0.36 dB to provide an inferred insertion loss of the splice.

Fusion splicing stage 300 further comprises an electric arc welding system for fiber joining. Preferably the system employs electrodes 6, 8 mounted in horizontal, transverse, axially opposed relationship as depicted by FIG. 1. In addition, it is preferred that the electrodes be located in the same vertical plane as the components of the imaging optical system. Electrodes 6, 8 are energized by high voltage supply, triggered automatically by control electronics after completion of fine fiber alignment.

A suitable arc softens and welds the fiber ends to form a durable, low loss splice. Known electrical supply means are used to drive the arc in a reliable manner, the electrical characteristics thereof being preselected through the user interface. Too intense an arc melts the fibers excessively, causing formation of a ball-like end that retreats from the joint area. Too weak an arc does not allow enough heating to cause a mechanically stable joint to form.

In another aspect of the invention, there is provided a method of fusion splicing optical fibers using system 10. Fibers 20 and 30 appointed for joining are mounted by an operator in LID injector 100 and detector 200. The ends of fibers 20, 30 are further secured in fusion stage 300 for alignment and splicing.

The fusion operation is initiated by preparing the fibers, preferably by removing the buffer and cladding layers, if any, from the fiber, and also cleaving the ends of the fibers to provide a joining surface at the end of each that is substantially planar and perpendicular to the fiber axis. The respective fibers are then placed in the clamp assemblies of stage 300. These clamp assemblies preferably comprise precision V-blocks, of a form typically used in machining operations, with clamps to hold the fibers securely therein. Even though the V-blocks hold the respective fibers in approximate collinear alignment, the accuracy of the axial separation and lateral positioning after initial mounting are inadequate for fusion joining. Therefore, the splicing stage 300 is preferably provided with further electronically controlled motion means for adaptively bringing the fibers into alignment that is sufficiently precise to produce a low transmission loss splice.

Preferably the adaptive alignment is carried out in an automatic cycle initiated by an operator, such as by depressing appropriate buttons 46 of interface 40. After the fiber ends are brought into optimal alignment by the positioning system in head 1, a firing sequence initiates an electric arc of the requisite intensity and duration to fusion join the now-contiguous ends of fibers 20 and 30.

The first stage of aligning the fibers may be carried out manually, preferably with the assistance of images of the respective fibers taken in two mutually perpendicular optical directions normal to the common fiber axis. The images are conveniently acquired using the optical system in splicing stage 300 and the electronics associated therewith and presented on display 48. More preferably, the alignment comprises use of an automated PAS system to carry out an initial three-dimensional alignment. The PAS system employs electronic processing of the fiber images to spatially locate the fibers and quantitatively determine their misalignment. The positioning system in splicing stage 300 is then actuated to bring the fibers into alignment. The process may be carried out iteratively until the alignment is within the measurement tolerance and resolution of the PAS optical system.

Use of an automated PAS system under system control for the initial alignment is especially preferred in field repair or installation situations wherein environmental or working conditions impede manual operations. In particular, PAS alignment can be effected even in cases where the fibers are initially mounted so far out of alignment that light injected by a LID injector does not traverse the inter-fiber gap, precluding any adaptive optimization solely using the LID system. However, as previously noted, the alignment accuracy attainable with PAS is diffraction limited, thereby also limiting the typically attainable transmission loss in joined fibers.

To overcome the inherent limits of a PAS-based splicing system, the alignment sequence in an aspect of the present method and system further employs a LID system. The LID system incorporates means for injecting light into the first fiber through its buffer layer and corresponding means for detecting the intensity of light emerging through the buffer layer of a second fiber. Optimal fiber alignment prior to splicing is effected by manipulating the orientation and relative position of the fibers to maximize light transmission. In the LID method, light incident on the buffer jacket of the first fiber at an injection position penetrates the buffer and cladding, enters the core, and propagates through the first fiber, gap, and second fiber, emerging from the core of the second fiber through its cladding and buffer at a detection position. These processes require that the fibers be bent at the injection and detection positions. Otherwise, light is constrained by total internal reflection to remain in the fiber core and solely to propagate therethrough.

A low profile LID system and a compact fusion splicing stage such as those aforementioned are advantageously employed in the construction of a modular, low profile system for fusion splicing of optical fibers. The LID injector and detector are conveniently mountable on the opposite lateral sides of the fusion splicing stage and in close proximity thereto, as depicted by FIGS. 1 and 4. The LID injector and detector both have a low profile, having no need for clearance above the devices to accommodate the open position of the upwardly rotatable closures normally used in conventional systems for mounting, securing, and deflecting fibers. This configuration conveniently affords a path through the head of the splicer system for the two optical fibers being joined that is simple and direct. The fibers remain substantially in a single plane parallel to the surface of the splicer head, traversing a path that deviates from a straight line only insofar as necessary to provide sufficient bending to allow injection and extraction of light for operation of the LID technique. As a result, the vertical extent of entire splicing stage is minimized, further lowering the profile of the present system. Preferably the LID components and the fusion splicing stage are configured as depicted in FIG. 1. The supply ends of first fiber 20 and second fiber 30 enter injector 100 and detector 200, respectively, in directions that are substantially collinear. Likewise, the free ends of the fibers 20, 30 to be joined in joint 16 emerge from injector 100 and detector 200, respectively, along a common direction that is generally parallel the aforementioned supply direction and only slightly displaced therefrom. Furthermore, the LID injector and detector 100, 200 and the fusion splicing stage 300 are preferably situated close to an edge of the splicing head housing. As far as possible, components that must be in the head are located rearward of the fiber path to allow the fiber edge to be as close as possible to the edge of the housing for greatest operational flexibility. In a preferred embodiment, the fusion head 1 is at most about 24 cm wide in the fiber direction, at most about 12 cm front to back, and 8 cm deep, and weighs at most about 2 kg. Advantageously such a fusion head is readily hand-carried and manipulated into position. The width of the fusion splicing head may be substantially reduced in embodiments that do not require LID functionality by omission of injector 100 and detector 200.

The compactness and rugged portability of the present splicing system are further enhanced by features of the splicing stage. The use of micropositioners such as piezo-electric and direct drive motors and the concomitant reduction or elimination of mechanical gears subject to misalignment and backlash enable the system to withstand the inevitable mechanical abuse, including shock, dirt, moisture, and other adversities that attend transporting and operating service equipment under field conditions. In addition, the use of lightweight micropositioners and related components further reduces gravity-induced bending and misalignment that generally have required previous systems to be calibrated and operated in a single, fixed orientation. By way of contrast, the present fusion head advantageously is operable in other arbitrary orientations, greatly facilitating its use for field service in cramped quarters.

As a result of its configuration and component design, the present fusion splicing system is compact and low profile, rendering it operable in very restricted quarters, such as very close to a wall, ceiling, floor, or cable support structure such as a cable tray. Moreover, only a minimal amount of free slack is required to situate the fibers in the splicer. These singular and advantageous features are a consequence of factors including the minimal clearance needed on the sides, top, and bottom of a housing for a splicing head that incorporates low profile, compact components, including the components of the LID system and the splicing stage included in the present apparatus. Other components of the splicing system, including power sources, electronics, and user interface, may be connected to the splicing head but housed separately. The head itself may thus be made quite compact for operation in confined spaces. Preferably, the interconnecting cables are terminated in plugs and receptacles of known type to permit the components of the present system to be separable and removable to facilitate such functions as transportation, storage, repair, calibration, and maintenance.

The system provides means for effecting high quality, low insertion loss fiber optic splices, for which active optical techniques are essential for attaining sufficiently precise alignment of the fibers in preparation for fusion splicing. The markedly improved functionality and portability afforded by the splicer of the invention is absent from existing systems which cannot perform high quality, low loss splices in the tight confines and adverse environmental and operational conditions for which the present system is especially adapted.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A method for joining a first optical fiber and a second optical fiber along a common fiber axis, the method comprising:
   a) providing a low profile fusion splicing system, the system comprising:
      (i) a low profile fusion splicing head having a fusion splicing stage including a clamping and fiber position adjustment system comprising holding means for holding said fibers substantially in a horizontal plane and motion means for moving said fibers in three orthogonal dimensions into coaxial, abutting alignment; an imaging optical system having a fiber imaging illuminator and a fiber image detector, said imaging optical system being adapted to acquire optical images of said fibers in a first imaging direction and a second imaging direction, said imaging directions being non-coincident; and an electric arc welding system;

(ii) a user interface having an output display and user input controls for activating the splicing system;

(iii) electronic control circuitry having imaging electronics that receive the output of said fiber image detector and produce a display signal feeding said output display; and fusion control electronics operably connected to activate said electric arc welding system and supply high voltage thereto;

b) preparing said first and second optical fibers by removing coatings present thereon and cleaving the ends of the fibers to form a mating end on each fiber;

c) arranging said first and second optical fibers in said holding means with said mating ends in facing relationship;

d) imaging said fibers in said imaging optical system prior to said joining;

e) positioning said optical fibers into coaxial, abutting alignment; and f) transmitting light from a first source traverses a first optical path and transmitting light from a second source traverses a second optical path, each of said paths being multiply folded;

g) fusing said fibers by said electric arc welding system.

2. A method as recited by claim 1, wherein said arranging comprises clamping said fibers in V-blocks comprised in said holding means in said fusion head.

3. A method as recited by claim 2, wherein said holding means comprises a first and a second removable clamp assembly.

4. A method as recited by claim 3 wherein: said fibers are mounted in said removable clamp assemblies prior to said preparing of said fibers; said preparing of said fibers is carried out using an auxiliary fiber preparation apparatus; and said arranging comprises placing said removable clamp assemblies bearing said fibers in said fusion splicing system.

5. A method as recited by claim 1, wherein said electronic control circuitry further comprises a profile alignment system in communication with said fiber image detector and said positioning comprises use of said profile alignment system to command said motion means to bring said fibers into alignment.

6. A method as recited by claim 1, wherein:

a. said fusion splicing head further comprises a local injection and detection system including a light injector adapted to inject light into said first fiber and a light detector detecting light in said second fiber, said local injection and detection system providing an electronic intensity signal indicative of the fraction of said injected light propagated across the interface between said fibers;

b. said electronic control circuitry further comprises a driver energizing said light injector and measurement electronics connected to said light detector receiving and processing said electronic intensity signal to provide a measured intensity signal; and a servo system operative to drive said actuators to maximize said measured intensity signal, whereby the position of said fibers is optimized prior to fusion thereof;

c. said method further comprises mounting said first optical fiber in said light injector and said second optical fiber in said light detector; and d. said positioning comprises use of said servo system to command said motion means to bring said fibers into alignment.

7. A method as recited by claim 6, wherein said light injected by said light injector has a wavelength ranging from about 800 to 900 nm.

8. A method as recited by claim 1, wherein said positioning comprises translation of said fibers in three mutually orthogonal directions.

9. A method as recited by claim 8, wherein one of said mutually orthogonal directions is substantially coincident with said common fiber axis.

10. A method as recited by claim 8, wherein said positioning comprises translation of said first fiber in a first transverse direction substantially orthogonal to said fiber direction and translation of said second fiber in a second transverse direction substantially orthogonal to said fiber direction and said first transverse direction.

11. A method as recited by claim 1, further comprising inferring the transmission loss of said fiber after said fusing.

12. A method as recited by claim 1, further comprising encasing said fused joint in a heat shrinkable sheath.

13. A method as recited by claim 1, further comprising storing and transferring data associated with said joining.

* * * * *